US012163530B2

(12) United States Patent
Thiyagarajan et al.

(10) Patent No.: US 12,163,530 B2
(45) Date of Patent: Dec. 10, 2024

(54) CENTRIFUGAL COMPRESSOR IMPELLER FOR A CHARGING DEVICE OF AN INTERNAL COMBUSTION ENGINE

(71) Applicant: Scania CV AB, Södertälje (SE)

(72) Inventors: Janakiraman Thiyagarajan, Södertälje (SE); Carl Fredriksson, Kinna (SE); Larsson Per-Inge, Vagnhärad (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/617,053

(22) PCT Filed: Jun. 3, 2020

(86) PCT No.: PCT/SE2020/050558

§ 371 (c)(1),
(2) Date: Dec. 7, 2021

(87) PCT Pub. No.: WO2020/251448

PCT Pub. Date: Dec. 17, 2020

(65) Prior Publication Data

US 2022/0316491 A1 Oct. 6, 2022

(30) Foreign Application Priority Data

Jun. 13, 2019 (SE) .................................... 1950700-3

(51) Int. Cl.
*F04D 29/28* (2006.01)
*F02B 37/00* (2006.01)
*F04D 29/30* (2006.01)

(52) U.S. Cl.
CPC ............ *F04D 29/284* (2013.01); *F02B 37/00* (2013.01); *F04D 29/30* (2013.01);
(Continued)

(58) Field of Classification Search
CPC ........ F04D 29/284; F04D 29/30; F02B 37/00; F05D 2240/303; F05D 2240/305; F05D 2240/306
See application file for complete search history.

(56) References Cited

U.S. PATENT DOCUMENTS 6,508,626 B1 * 1/2003 Sakurai ............... F04D 29/2277 416/183
2009/0191047 A1 7/2009 Schlinker et al.
2010/0254816 A1 10/2010 Dettmann et al.
2012/0189454 A1 * 7/2012 Iwakiri ................ F04D 29/284 416/223 R
(Continued)

FOREIGN PATENT DOCUMENTS

EP 2392830 A1 12/2011
EP 3369938 A1 9/2018
(Continued)

OTHER PUBLICATIONS

Scania CV AB, International Patent Application No. PCT/SE2020/050558, International Preliminary Report on Patentability, Dec. 14, 2021.
(Continued)

*Primary Examiner* — Audrey B. Walter
(74) *Attorney, Agent, or Firm* — Moore & Van Allen PLLC; W. Kevin Ransom

(57) ABSTRACT

A centrifugal compressor impeller is disclosed for a charging device of an internal combustion engine. The impeller comprises a hub, a number of full blades arranged on the hub and being spaced in a circumferential direction of the impeller, and one splitter blade arranged between a pressure side of a first full blade and a suction side of a second full blade of the number of full blades. A leading edge of the splitter blade is arranged closer to the pressure side of the first full blade than the suction side of the second full blade. The present disclosure further relates to a charging device, an internal combustion engine, and a vehicle.

21 Claims, 3 Drawing Sheets

(52) U.S. Cl.
CPC .. *F05D 2240/303* (2013.01); *F05D 2240/305* (2013.01); *F05D 2240/306* (2013.01)

(56) References Cited

U.S. PATENT DOCUMENTS

| | | | | |
|---|---|---|---|---|
| 2013/0195667 | A1 | 8/2013 | Hoshi et al. | |
| 2013/0266450 | A1 * | 10/2013 | Tomita | F04D 29/30 416/223 R |
| 2013/0272861 | A1 | 10/2013 | Tomita et al. | |
| 2014/0202202 | A1 | 7/2014 | Taguchi et al. | |

FOREIGN PATENT DOCUMENTS

| | | | |
|---|---|---|---|
| GB | 2337795 | A | 12/1999 |
| JP | 5644495 | A | 4/1981 |
| JP | 5076999 | B2 | 11/2012 |
| KR | 20110057737 | A | 6/2011 |
| WO | 9002265 | A1 | 3/1990 |

OTHER PUBLICATIONS

Scania CV AB, International Patent Application No. PCT/SE2020/050558, International Search Report, Jul. 14, 2020.
Scania CV AB, International Patent Application No. PCT/SE2020/050558, Written Opinion, Jul. 14, 2020.
Scania CV AB, Swedish Patent Application No. 1950700-3, Office Action, Dec. 6, 2019.
Scania CV AB, European Patent Application No. 20823431.0, Extended European Search Report, Jun. 9, 2023.
Scania CV AB, Brazilian Patent Application No. BR112021024029-2, Preliminary Office Action, Jun. 11, 2024.

* cited by examiner

CENTRIFUGAL COMPRESSOR IMPELLER FOR A CHARGING DEVICE OF AN INTERNAL COMBUSTION ENGINE

CROSS-REFERENCE TO RELATED APPLICATIONS

This application is a National Stage Patent Application (filed under 35 § U.S.C. 371) of PCT/SE2020/050558, filed Jun. 3, 2020 of the same title, which, in turn claims priority to Swedish Patent Application No. 1950700-3 filed Jun. 13, 2019 of the same title; the contents of each of which are hereby incorporated by reference.

FIELD OF THE INVENTION

The present disclosure relates to a centrifugal compressor impeller for a charging device of an internal combustion engine. The present disclosure further relates to a charging device for an internal combustion engine, wherein the charging device comprises a centrifugal compressor impeller. Moreover, the present disclosure relates to an internal combustion engine comprising a charging device, as well as a vehicle comprising an internal combustion engine.

BACKGROUND OF THE INVENTION

Charging devices, such as turbochargers, are used to compress air to an inlet of a combustion engine. A charging device can increase the performance and fuel efficiency of a combustion engine. With increasing demands on combustion engines, higher pressure turbochargers are being designed and manufactured. Compressor impeller noise is an unavoidable by-product of high pressure turbochargers used in modern engines.

Moreover, performance targets on combustion engines have led to the development of compressor impellers comprising splitter blades between the full blades of the compressor impeller. These types of compressor impellers can increase the operational range and overall efficiency of a charging device. However, a drawback with compressor impellers comprising splitter blades is that they generate more noise than purely full bladed impellers, and in particular regarding the exducer induced blade passing frequency (BPF) noise contribution. Moreover, the exducer induced blade passing frequency noise is not only higher but also in a frequency that is audible to the human ear (2 kHz-8 kHz).

Previously, the problem of noise generated by compressor impellers has been handled by providing the charging device with noise deflectors and/or damping systems surrounding the charging device. Such noise deflectors and/or damping systems can attenuate the noise generated to some extent. However, such solutions add costs, weight, and complexity to the charging device. Moreover, charging devices, such as turbochargers, generate a lot of heat during operation and must, in many cases, be cooled by air surrounding to the charging device, which puts limitations on using damping systems surrounding the charging device, and the like.

SUMMARY OF THE INVENTION

It is an object of the present invention to overcome, or at least alleviate, at least some of the above-mentioned problems and drawbacks.

According to a first aspect of the invention, the object is achieved by a centrifugal compressor impeller for a charging device of an internal combustion engine. The impeller comprises a hub, a number of full blades arranged on the hub and being spaced in a circumferential direction of the impeller, and one splitter blade arranged between a pressure side of a first full blade and a suction side of a second full blade of the number of full blades. A leading edge of the splitter blade is arranged closer to the pressure side of the first full blade than the suction side of the second full blade.

Since the leading edge of the splitter blade is arranged closer to the pressure side of the first full blade than the suction side of the second full blade, a compressor impeller is provided generating less noise, and in particular regarding the exducer induced blade passing frequency noise contribution. This because a more uniform pressure distribution is provided from a splitter pressure side passage and a splitter suction side passage, which in turn eliminates the half frequency harmonics that otherwise would be present downstream the compressor impeller and generate lower half-tone blade passing frequency noise.

Accordingly, due to these features, a compressor impeller is provided having a splitter blade, which provides conditions for increased operational range and overall efficiency of a charging device, while the compressor impeller generates less noise during operation.

Moreover, since the compressor impeller generates less noise during operation, the need for noise deflectors and/or damping systems surrounding the charging device is reduced, which provides conditions for a less costly, a lighter, and less complex charging device.

Accordingly, a centrifugal compressor impeller is provided overcoming, or at least alleviating, at least some of the above-mentioned problems and drawbacks. As a result, the above-mentioned object is achieved.

Optionally, the leading edge of the splitter blade is arranged at least 0.5%, or at least 5%, closer to the pressure side of the first full blade than the suction side of the second full blade. Thereby, it is ensured that a compressor impeller is provided generating less noise, in particular regarding the exducer induced blade passing frequency noise contribution.

Optionally, a tip angle of the leading edge of the splitter blade is larger than blade angles of the first and second full blades measured at meridional projections of the leading edge on the first and second full blades. Thereby, an even more uniform pressure distribution is provided from the splitter pressure side passage and the splitter suction side passage. As a result thereof, a compressor impeller is provided generating even less noise during operation.

Optionally, the tip angle of the leading edge of the splitter blade is at least 0.5 degrees, or at least 5 degrees, larger than blade angles of the first and second full blades measured at the meridional projections of the leading edge on the first and second full blades. Thereby, it is ensured that an even more uniform pressure distribution is provided from the splitter pressure side passage and the splitter suction side passage. As a result thereof, a compressor impeller is provided generating even less noise during operation.

Optionally, the splitter blade comprises a leading section comprising 30% of the length of the splitter blade measured from the leading edge in an intended flow direction along the splitter blade, and wherein each portion of the leading section is arranged closer to the pressure side of the first full blade than the suction side of the second full blade. Thereby, an even more uniform pressure distribution is provided from the splitter pressure side passage and the splitter suction side passage. As a result thereof, a compressor impeller is provided generating even less noise during operation.

Optionally, the blade angles along the leading section are larger than the blade angles of the first and second full blades measured at meridional projections of the leading section on the first and second full blades. Thereby, an even more uniform pressure distribution is provided from the splitter pressure side passage and the splitter suction side passage. As a result thereof, a compressor impeller is provided generating even less noise during operation.

Optionally, the meridional projections of the leading edge on the first and second full blades are downstream of leading edges of the first and second full blades at a position within the range of 20%-40%, or within the range of 25%-35%, of the length of the first and second full blades measured from the leading edges in an intended flow direction along the first and second full blades. Thereby, a compressor impeller is provided where the leading edge of the splitter blade is closer to the leading edges of the first and second full blades than what is commonly used on compressor impellers comprising splitter blades. As a result, a more uniform pressure distribution is provided from the suction side and pressure side of the splitter blade passages.

Optionally, a shroud side of the splitter blade is clocked towards a shroud side of the first full blade in relation to a center line extending between shroud sides of the first and second full blades. Thereby, an even more advantageous pressure distribution is provided regarding noise generation on either side of the splitter blade. As a result thereof, a compressor impeller is provided generating even less noise during operation.

Optionally, the full extent of the shroud side of the splitter blade is clocked towards the shroud side of the first full blade in relation to the center line. Thereby, an even more uniform pressure distribution is provided from the splitter pressure side passage and the splitter suction side passage. As a result thereof, a compressor impeller is provided generating even less noise during operation.

Optionally, a first distance between the center line and a shroud side of the leading edge of the splitter blade is greater than a second distance between the center line and a shroud side of a portion of the splitter blade located downstream of the leading edge at 30% of the length of the splitter blade measured from the leading edge in an intended flow direction along the splitter blade. Thereby, an even more uniform pressure distribution is provided from the splitter pressure side passage and the splitter suction side passage. As a result thereof, a compressor impeller is provided generating even less noise during operation.

Optionally, the first distance is at least 1%, or at least 5%, greater than the second distance. Thereby, it is ensured that an even more uniform pressure distribution is provided from the splitter pressure side passage and the splitter suction side passage. As a result thereof, a compressor impeller is provided generating even less noise during operation.

Optionally, an exit blade angle of an outlet edge portion of the splitter blade is different from exit blade angles of outlet edge portions of the first and second full blades. Thereby, an even more uniform pressure distribution is provided from the splitter pressure side passage and the splitter suction side passage. This because a more uniform pressure distribution is provided especially at the outlet of the compressor impeller which reduces the exducer induced blade passing frequency (BPF) noise contribution that propagates from the compressor impeller. As a result thereof, a compressor impeller is provided generating even less noise during operation.

Optionally, an exit blade angle of an outlet edge portion of the splitter blade is 0.5-15 degrees smaller, or 1-12 degrees smaller, than exit blade angles of outlet edge portions of the first and second full blades. Thereby, it is ensured that an even more advantageous pressure distribution is provided regarding noise generation. As a result thereof, a compressor impeller is provided generating even less noise during operation. Optionally, the radius of an outlet edge portion of the splitter blade is 0.5-10% greater, or 3-7% greater, than the radii of outlet edge portions of the first and second full blades. Thereby, an even more advantageous pressure distribution is provided regarding noise generation. This because a more uniform pressure distribution is provided especially at the outlet of the compressor impeller which reduces the exducer induced blade passing frequency (BPF) noise contribution that propagates from the compressor impeller. As a result thereof, a compressor impeller is provided generating even less noise during operation.

Optionally, the impeller comprises the same number of splitter blades as the number of full blades, and wherein each splitter blade of the number of splitter blades is arranged between two full blades of the number of full blades. Thereby, an impeller is provided having conditions for increased operational range and overall efficiency of a charging device, while the compressor impeller generates less noise during operation.

According to a second aspect of the invention, the object is achieved by a charging device for an internal combustion engine, wherein the charging device comprises an impeller according to some embodiments of the present disclosure.

Since the charging device comprises an impeller according to some embodiments, a charging device is provided having conditions for increased operational range and overall efficiency while the charging device generates less noise during operation. Moreover, the need for noise deflectors and/or damping systems surrounding the charging device is reduced, which provides conditions for a less costly, a lighter, and less complex charging device.

Accordingly, a charging device is provided overcoming, or at least alleviating, at least some of the above-mentioned problems and drawbacks. As a result, the above-mentioned object is achieved.

Optionally, the charging device is a turbocharger. Thereby, a turbocharger is provided having conditions for increased operational range and overall efficiency while the turbocharger generates less noise during operation. Moreover, the need for noise deflectors and/or damping systems surrounding the turbocharger is reduced, which provides conditions for a less costly, a lighter, and less complex turbocharger.

According to a third aspect of the invention, the object is achieved by an internal combustion engine comprising a charging device according to some embodiments of the present disclosure.

Since the internal combustion engine comprises a charging device according to some embodiments, an internal combustion engine is provided having conditions for increased operational range and overall efficiency while the internal combustion engine generates less noise during operation. Moreover, the need for noise deflectors and/or damping systems surrounding the charging device is reduced, which provides conditions for a less costly, a lighter, and less complex internal combustion engine.

Accordingly, an internal combustion engine is provided overcoming, or at least alleviating, at least some of the above-mentioned problems and drawbacks. As a result, the above-mentioned object is achieved.

According to a fourth aspect of the invention, the object is achieved by a vehicle comprising an internal combustion engine according to some embodiments of the present disclosure.

Since the vehicle comprises an internal combustion engine according to some embodiments, a vehicle is provided having conditions for increased operational range and overall efficiency while the internal combustion engine of the vehicle generates less noise during operation.

Accordingly, a vehicle is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION OF THE INVENTION

Aspects of the present invention will now be described more fully. Like numbers refer to like elements throughout. Well-known functions or constructions will not necessarily be described in detail for brevity and/or clarity.

Figure 1:
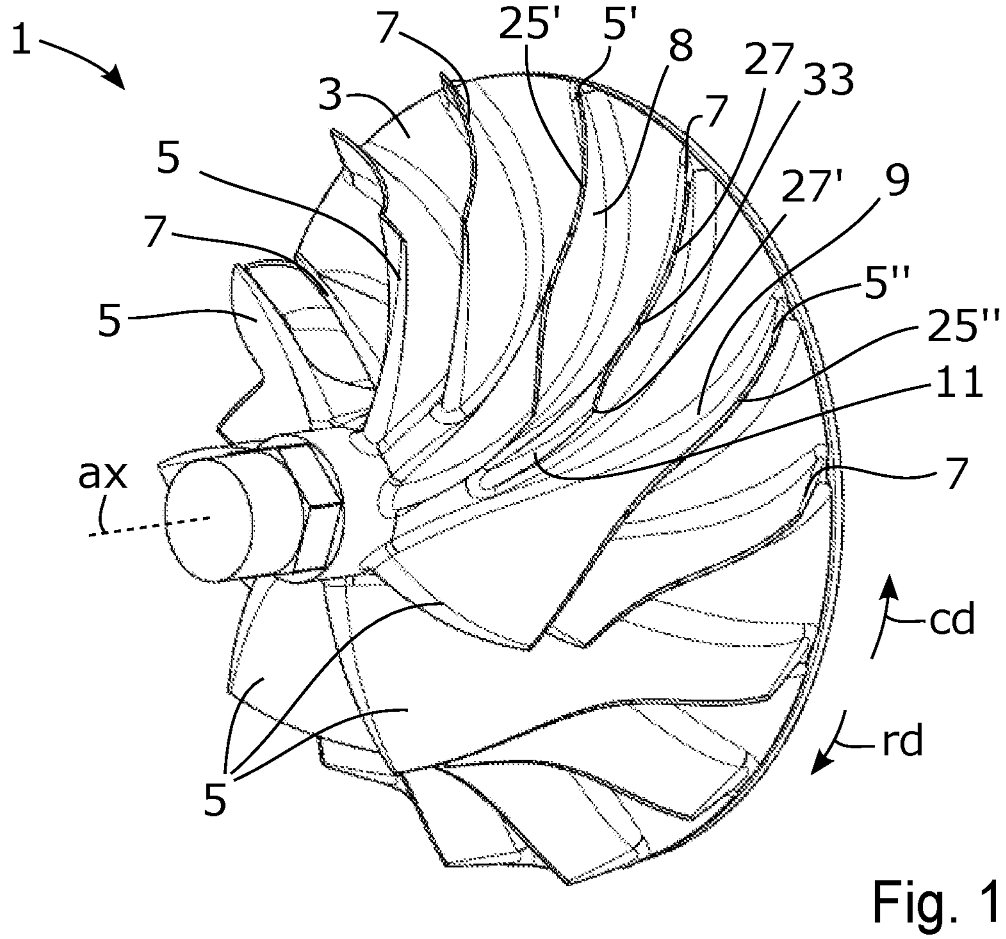
FIG. 1 illustrates a perspective view of a centrifugal compressor impeller, according to some embodiments.

FIG. 1 illustrates a perspective view of a centrifugal compressor impeller 1, according to some embodiments. The centrifugal compressor impeller 1 is configured to be arranged in a charging device of an internal combustion engine and is configured to compress air to an inlet of the combustion engine by rotating in a rotational direction rd around a rotation axis ax, as is further explained herein. For the reason of brevity and clarity, the centrifugal compressor impeller 1 is in some places herein referred to as the compressor impeller 1, or simply the impeller 1.

The impeller 1 comprises a hub 3 and a number of full blades 5, 5', 5" arranged on the hub. The full blades 5, 5', 5" of the number of full blades 5, 5', 5" are spaced in a circumferential direction cd of the impeller 1. Moreover, the impeller 1 comprises a number of splitter blades 7, wherein each splitter blade 7 of the number of splitter blades 7 is arranged between two full blades 5, 5', 5" of the number of full blades 5, 5', 5". The splitter blades 7 are also spaced in the circumferential direction cd of the impeller 1. Accordingly, the impeller 1 comprises the same number of splitter blades 7 as the number of full blades 5, 5', 5". According to the illustrated embodiments, the impeller 1 comprises seven full blades 5, 5', 5" and seven splitter blades 7. According to further embodiments, the impeller 1 may comprise another number of full blades 5, 5', 5" and splitter blades 7, such as three, four, five, six, eight, nine, or the like.

For the reason of brevity and clarity, one splitter blade 7 of the number of splitter blades 7 is referred to in some places herein. However, all other splitter blades 7 of the number of splitter blades 7 may comprise the same shape, layout, features, functions, and advantages as the splitter blade 7 referred to. Likewise, even though one of the full blades 5, 5', 5" may be referred to in the following, the other full blades 5, 5', 5" may comprise the same shape, layout, features, and functions as the full blade 5, 5', 5" referred to. The splitter blade 7 is arranged between a pressure side 8 of a first full blade 5' and a suction side 9 of a second full blade 5" of the number of full blades 5, 5', 5". The first and second full blades 5', 5" are adjacent blades 5', 5" in the sense that no other full blade 5 or blades 5 is/are arranged between the first and second full blades 5', 5". However, as understood from the above described, according to the embodiments described herein, one splitter blade 7 arranged between each pair of adjacent full blades 5, 5', 5".

As commonly known in the technical field, splitter blades 7 are blades arranged between full blades with their upstream sides simply cut off such that their leading edges are arranged downstream of leading edges of the full blades. Common splitter blades have the same shape as the full blades with the exception that their upstream sides are cut off.

Figure 2:
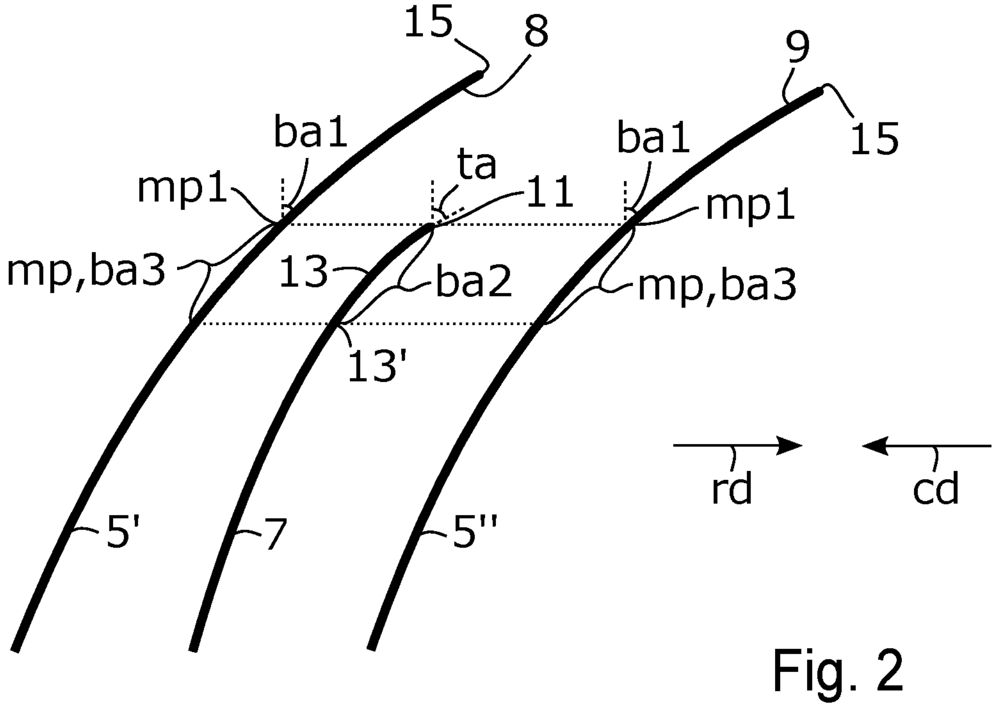
FIG. 2 illustrates an explanatory diagram illustrating the positional relationship between full blades and splitter blades on a shroud side in a circumferential direction of the impeller, according to some embodiments.

FIG. 2 illustrates an explanatory diagram illustrating the positional relationship between full blades 5', 5" and splitter blades 7 on a shroud side in a circumferential direction cd of the impeller, according to some embodiments.

As best seen in FIG. 2, a leading edge 11 of the splitter blade 7 is arranged downstream of leading edges 15 of the first and second full blades 5', 5". Furthermore, as best seen in FIG. 2, the leading edge 11 of the splitter blade 7 is arranged closer to the pressure side 8 of the first full blade 5' than the suction side 9 of the second full blade 5", in the circumferential direction cd of the impeller. As a result, the impeller will generate less noise, in particular regarding the exducer induced blade passing frequency noise contribution.

According to the illustrated embodiments, the leading edge 11 of the splitter blade 7 is arranged approximately 21% closer to the pressure side 8 of the first full blade 5' than the suction side 9 of the second full blade 5", in the circumferential direction cd of the impeller. According to further embodiments, the leading edge 11 of the splitter blade 7 may be arranged at least 0.5%, or at least 5%, closer to the pressure side 8 of the first full blade 5' than the suction side 9 of the second full blade 5", in the circumferential direction cd of the impeller.

Moreover, according to the illustrated embodiments, a tip angle ta of the leading edge 11 of the splitter blade 7 is larger than blade angles ba1 of the first and second full blades 5', 5" measured at meridional projections mp1 of the leading edge 11 on the first and second full blades 5', 5". The tip angle ta of the leading edge 11 of the splitter blade 7 may be at least 0.5 degrees, or at least 5 degrees, larger than blade angles ba1 of the first and second full blades 5', 5" measured at the meridional projections mp1 of the leading edge 11 on the first and second full blades 5', 5". The wording "tip angle" as used herein may encompass an average blade angle of an inlet portion of the splitter blade 7, wherein the inlet portion of the splitter blade 7 may comprise a certain proportion of the splitter blade 7 at the inlet thereof, such as for example 3% of the length of the splitter blade 7 measured from the leading edge 11 along an intended flow direction along the splitter blade 7.

The splitter blade 7 comprises a leading section 13 comprising 30% of the length of the splitter blade 7 measured from the leading edge 11 in an intended flow direction along the splitter blade 7. According to the illustrated embodiments, each portion of the leading suction section 13 is arranged closer to the pressure side 8 of the first full blade 5' than the suction side 9 of the second full blade 5", in the circumferential direction cd of the impeller.

Moreover, according to the illustrated embodiments, the blade angles ba2 along the leading section 13 are larger than the blade angles ba3 of the first and second full blades 5', 5" measured at meridional projections mp of the leading section 13 on the first and second full blades 5', 5".

According to the illustrated embodiments, the meridional projections mp1 of the leading edge 11 on the first and second full blades 5', 5" are located downstream of leading edges 15 of the first and second full blades 5', 5" at a position located at 32% of the length of the first and second full blades 5', 5" measured from the leading edges 15 of the first and second full blades 5', 5" in an intended flow direction along the first and second full blades 5', 5".

According to further embodiments, the meridional projections mp1 of the leading edge 11 on the first and second full blades 5', 5" may be downstream of leading edges 15 of the first and second full blades 5', 5" at a position within the range of 20%-40%, or within the range of 25%-35%, of the length of the first and second full blades 5', 5", measured from the leading edges 15 in the intended flow direction along the first and second full blades 5', 5".

Figure 3:
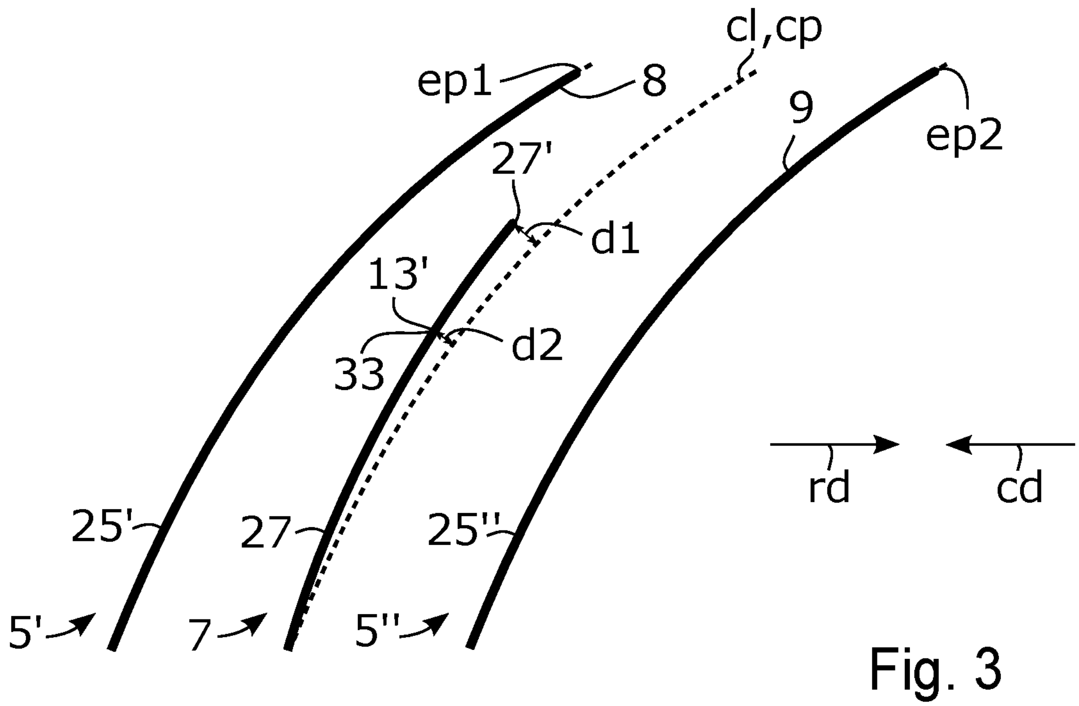
FIG. 3 illustrates an explanatory diagram illustrating the positional relationship between full blades and splitter blades on a shroud side in a circumferential direction of the impeller, according to some embodiments.

FIG. 3 illustrates an explanatory diagram illustrating the positional relationship between full blades 5', 5" and splitter blades 7 on a shroud side 25', 25", 27 in a circumferential direction cd of the impeller, according to some embodiments. As indicated in FIG. 3, a shroud side 27 of the splitter blade 7 is clocked, i.e. moved in the circumferential direction cd of the impeller, towards a shroud side 25' of the first full blade 5' in relation to a center line cl extending between shroud sides 25', 25" of the first and second full blades 5', 5". Since the shroud side 27 of the splitter blade 7 is clocked towards the shroud side 25' of the first full blade 5', the shroud side 27 of the splitter blade 7 is also clocked towards the pressure side 8 of the first full blade 5' in relation to the center line cl extending between shroud sides 25', 25" of the first and second full blades 5', 5".

The center line cl, as referred to herein, is a center line cl extending between shroud sides 25', 25" of the first and second full blades 5', 5" with an equal distance to shroud sides 25', 25" of the first and second full blades 5', 5" along the extension of the center line cl. Accordingly, the shape and curvature of the center line cl is the same as the shape and curvature of the shroud sides 25', 25" of the first and second full blades 5', 5". Moreover, the center line cl extends along a center plane cp, which center plane cp extends between extension planes ep1, ep2 of the first and second full blades 5', 5" with an equal distance to the extension planes ep1, ep2 of the first and second full blades 5', 5" along the extension of the center plane cp. As understood from the above, the shape and curvature of the center plane cp is the same as the shape and curvature of the extension planes ep1, ep2 of the first and second full blades 5', 5". The shroud side of a common splitter blade would extend along the center line cl indicated in FIG. 3. Moreover, as understood from the above, a common splitter blade would be arranged such that the extension plane thereof would extend along the center plane cp referred to herein.

According to the illustrated embodiments, upstream portions of the shroud side 27 of the splitter blade 7 is clocked to a greater extent towards the shroud side 25' of the first full blade 5' than downstream portions of the shroud side 27 of the splitter blade 7. As a result thereof, a first distance d1 between the center line cl and a shroud side 27' of the leading edge 11 of the splitter blade 7 is greater than a second distance d2 between the center line cl and a shroud side 33 of a portion 13' of the splitter blade 7 located downstream of the leading edge 11 at 30% of the length of the splitter blade 7 measured from the leading edge 11 in an intended flow direction along the splitter blade 7. According to the illustrated embodiments, the first distance d1 is approximately 45% greater than the second distance d2. According to further embodiments, the first distance d1 may be at least 1%, or at least 5%, greater than the second distance d2.

Moreover, as understood from the above, due to these features, the angle distribution along the splitter blade is changed relative to a common splitter blade which would extend along the center plane cp indicated in FIG. 3. Thereby, an even more advantageous pressure distribution is provided regarding noise generation. This is because of a more uniform pressure distribution from the splitter pressure side passage and the splitter suction side passage, which in turn eliminates the half frequency harmonics that otherwise would be present downstream the compressor impeller 1 and generate lower half-tone blade passing frequency noise. According to the illustrated embodiments, the full extent of the shroud side 27 of the splitter blade 7 is clocked towards the shroud side 25' of the first full blade 5' in relation to the center line cl. According to further embodiments, only an upstream portion of the shroud side 27 of the splitter blade 7 may be clocked towards the shroud side 25' of the first full blade 5' in relation to the center line cl.

Moreover, according to some embodiments of the present disclosure, a hub side of the splitter blade 7 may be clocked towards a hub side of the first full blade 5' in relation to the center plane cp. According to such embodiments, upstream portions of the hub side of the splitter blade 7 may be clocked to a greater extent towards the hub side of the first full blade 5' than downstream portions of the hub side of the splitter blade 7.

Figure 4:
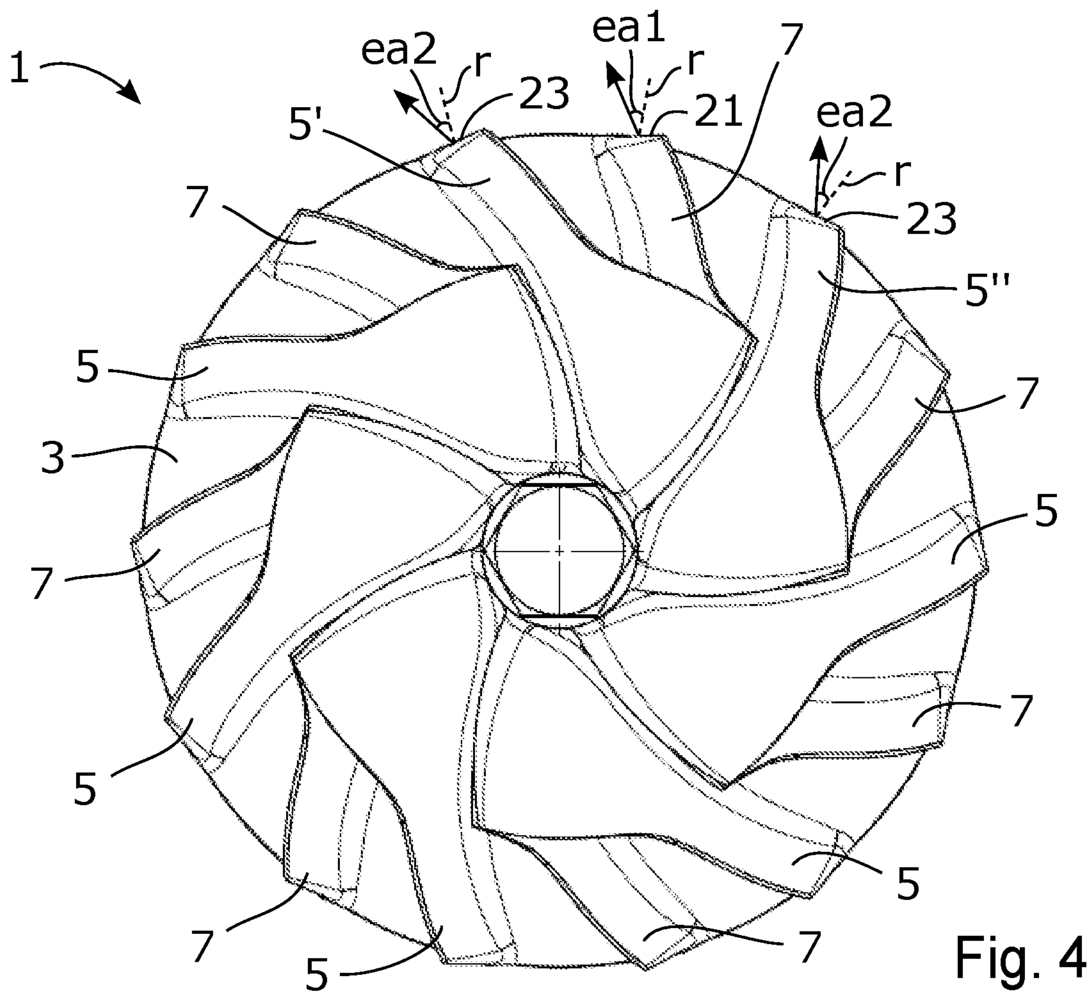
FIG. 4 illustrates a front view of the centrifugal compressor impeller, according to the embodiments illustrated in FIG. 1.

FIG. 4 illustrates a front view of the centrifugal compressor impeller 1, according to the embodiments illustrated in FIG. 1. As indicated in FIG. 4, according to the illustrated embodiments, an exit blade angle ea1 of an outlet edge portion 21 of the splitter blade 7 is different from exit blade angles ea2 of outlet edge portions 23 of the first and second full blades 5', 5". The exit blade angle ea1 of an outlet edge portion 21 of the splitter blade 7 may be 0.5-15 degrees smaller, or 1-12 degrees smaller, than exit blade angles ea2 of outlet edge portions 23 of the first and second full blades 5', 5". Thereby, an even more advantageous pressure distribution is provided regarding noise generation. This is because of a more uniform pressure distribution from the splitter pressure side passage and the splitter suction side passage, which in turn eliminates the half frequency harmonics that otherwise would be present downstream the compressor impeller 1 and generate lower half-tone blade passing frequency noise. The wording "exit blade angle" as used herein may encompass an average blade angle of an outlet edge portion 21, 23, wherein the outlet edge portion 21, 23 may comprise a certain proportion of the blade 5', 5'', 7 at the outlet thereof, such as for example 3% of the length of the blade 5', 5'', 7 measured along an intended flow direction along the blade 5', 5'', 7. The exit blade angles as defined herein may be measured relative a radial direction r of the compressor impeller 1.

Figure 5:
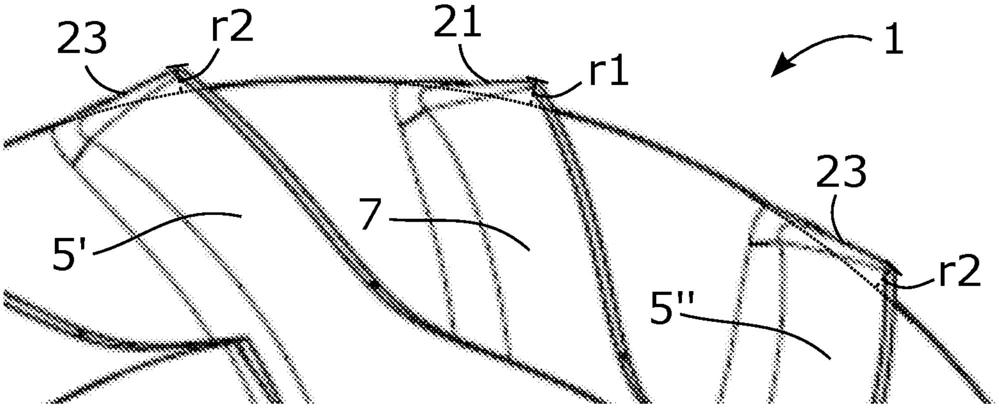
FIG. 5 illustrates an enlarged view of a portion of the compressor impeller illustrated in FIG. 4.

FIG. 5 illustrates an enlarged view of a portion of the compressor impeller 1 illustrated in FIG. 4. According to these embodiments, the radius r1 of an outlet edge portion 21 of the splitter blade 7 indicated in FIG. 5, may be 0.5-10% greater, or 3-7% greater, than the radii r2 of outlet edge portions 23 of the first and second full blades 5', 5''. Thereby, an even more advantageous pressure distribution is provided regarding noise generation. This is because of a more uniform pressure distribution from the splitter pressure side passage and the splitter suction side passage, which in turn eliminates the half frequency harmonics that otherwise would be present downstream the compressor impeller 1 and generate lower half-tone blade passing frequency noise.

Figure 6:
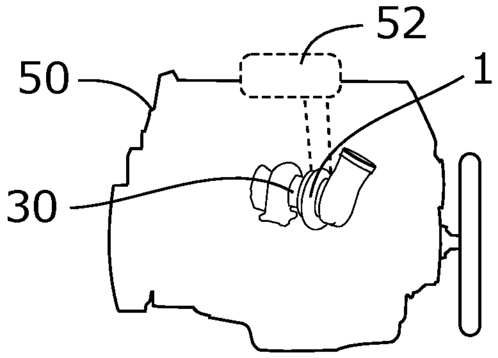
FIG. 6 schematically illustrates an internal combustion engine, according to some embodiments.

FIG. 6 schematically illustrates an internal combustion engine 50, according to some embodiments. The internal combustion engine 50 comprises a charging device 30. The charging device 30 comprises an impeller 1 according to the embodiments illustrated in FIG. 1, FIG. 4, and FIG. 5. The impeller 1 is configured to compress air to an air inlet 52 of the internal combustion engine 50. According to the illustrated embodiments, the charging device 30 is a turbocharger. Thus, according to the illustrated embodiments, the impeller 1 is arranged on a shaft together with a turbine, wherein the turbine is configured to be powered by an exhaust flow of the internal combustion engine 50 so as to power the compressor impeller 1.

According to further embodiments, the impeller 1, as referred to herein, may be comprised in another type of charging device for an internal combustion engine 50, such as a mechanically and/or electrically driven charging device.

The internal combustion engine 50, as referred to herein, may for example be a compression ignition engine, such as a diesel engine, or an Otto engine with a spark-ignition device, wherein the Otto engine may be configured to run on gas, petrol, alcohol, similar volatile fuels, or combinations thereof.

Figure 7:
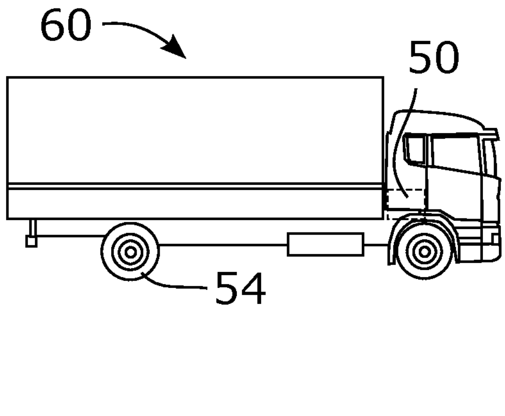
FIG. 7 illustrates a vehicle, according to some embodiments.

FIG. 7 illustrates a vehicle 60, according to some embodiments. The vehicle 60 comprises an internal combustion engine 50 according to the embodiments illustrated in FIG. 6. The internal combustion engine 50 is configured to provide motive power to the vehicle 60 via wheels 54 of the vehicle 60.

According to the illustrated embodiments, the vehicle 60 is a truck. However, according to further embodiments, the vehicle 60, as referred to herein, may be another type of manned or unmanned vehicle for land or water based propulsion such as a lorry, a bus, a construction vehicle, a tractor, a car, a ship, a boat, or the like.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

The compressor impeller 1 referred to herein may also be referred to as a compressor wheel 1. Therefore, throughout this disclosure, the wording "wheel" may replace the wording "impeller".

The blade angles and tip angles as defined herein may be measured relative a plane extending along the rotation axis ax of the compressor impeller 1.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A centrifugal compressor impeller for a charging device of an internal combustion engine, wherein the impeller comprises:

a hub;

a number of full blades arranged on the hub and being spaced in a circumferential direction of the impeller; and one splitter blade comprising a leading edge and an outlet edge, said splitter blade arranged between a pressure side of a first full blade and a suction side of a second full blade of the number of full blades, wherein the leading edge of the splitter blade is arranged closer to the pressure side of the first full blade than the outlet edge of the splitter blade, and the outlet edge of the splitter blade is located closer to the suction side of the second full blade than the leading edge of the splitter blade, and wherein a tip angle of the leading edge of the splitter blade is larger than blade angles of the first and second full blades measured in reference to an axis perpendicular to meridional projections of the leading edge on the first and second full blades.

2. The impeller according to claim 1, wherein the leading edge of the splitter blade is arranged either at least 0.5% or at least 5% closer to the pressure side of the first full blade than the suction side of the second full blade.

3. The impeller according to claim 1, wherein the tip angle of the leading edge of the splitter blade is either at least 0.5 degrees or at least 5 degrees larger than blade angles of the first and second full blades measured in reference to the axis perpendicular to the meridional projections of the leading edge on the first and second full blades.

4. The impeller according to claim 1, wherein the meridional projections of the leading edge on the first and second full blades are downstream of leading edges of the first and second full blades at a position of either within a range of 20%-40% or within a range of 25%-35% of a length of the first and second full blades measured from the leading edges in an intended flow direction along the first and second full blades.

5. The impeller according to claim 1, wherein an exit blade angle of an outlet edge portion of the splitter blade is different from exit blade angles of outlet edge portions of the first and second full blades.

6. The impeller according to claim 1, wherein an exit blade angle of an outlet edge portion of the splitter blade is either 0.5-15 degrees smaller or 1-12 degrees smaller than exit blade angles of outlet edge portions of the first and second full blades.

7. The impeller according to claim 1, wherein a radius of an outlet edge portion of the splitter blade is either 0.5-10% greater or 3-7% greater than radii of outlet edge portions of the first and second full blades.

8. The impeller according to claim 1, wherein the impeller comprises the same number of splitter blades as the number of full blades, and wherein each splitter blade of the number of splitter blades is arranged between two full blades of the number of full blades.

9. The impeller according to claim 1, wherein the splitter blade comprises a leading section comprising 30% of a length of the splitter blade measured from the leading edge in an intended flow direction along the splitter blade, and wherein each portion of the leading section is arranged closer to the pressure side of the first full blade than the suction side of the second full blade.

10. The impeller according to claim 9, wherein the blade angles along the leading section of the splitter blade are larger than the blade angles of the first and second full blades measured in reference to an axis perpendicular to meridional projections of the leading section on the first and second full blades.

11. The impeller according to claim 1, wherein a shroud side of the splitter blade is clocked towards a shroud side of the first full blade in relation to a center line extending between shroud sides of the first and second full blades.

12. The impeller according to claim 11, wherein the full extent of the shroud side of the splitter blade is clocked towards the shroud side of the first full blade in relation to the center line.

13. The impeller according to claim 11, wherein a first distance between the center line and a shroud side of the leading edge of the splitter blade is greater than a second distance between the center line and a shroud side of a portion of the splitter blade located downstream of the leading edge at 30% of a length of the splitter blade measured from the leading edge in an intended flow direction along the splitter blade.

14. The impeller according to claim 13, wherein the first distance is either at least 1% or at least 5% greater than the second distance.

15. A charging device for an internal combustion engine, wherein the charging device comprises an impeller, wherein the impeller comprises:

a hub;

a number of full blades arranged on the hub and being spaced in a circumferential direction of the impeller; and one splitter blade comprising a leading edge and an outlet edge, said splitter blade arranged between a pressure side of a first full blade and a suction side of a second full blade of the number of full blades, wherein the leading edge of the splitter blade is arranged closer to the pressure side of the first full blade than the outlet edge of the splitter blade, and the outlet edge of the splitter blade is located closer to the suction side of the second full blade than the leading edge of the splitter blade, and wherein a tip angle of the leading edge of the splitter blade is larger than blade angles of the first and second full blades measured in reference to an axis perpendicular to meridional projections of the leading edge on the first and second full blades.

16. The charging device according to claim 15, wherein the charging device is a turbocharger.

17. An internal combustion engine comprising a charging device comprising a centrifugal compressor impeller for the charging device of the internal combustion engine, wherein the impeller comprises:

a hub;

a number of full blades arranged on the hub and being spaced in a circumferential direction of the impeller; and one splitter blade comprising a leading edge and an outlet edge, said splitter blade arranged between a pressure side of a first full blade and a suction side of a second full blade of the number of full blades, wherein the leading edge of the splitter blade is arranged closer to the pressure side of the first full blade than the outlet edge of the splitter blade, and the outlet edge of the splitter blade is located closer to the suction side of the second full blade than the leading edge of the splitter blade, and wherein a tip angle of the leading edge of the splitter blade is larger than blade angles of the first and second full blades measured in reference to an axis perpendicular to meridional projections of the leading edge on the first and second full blades.

18. A vehicle comprising an internal combustion engine comprising a charging device comprising a centrifugal compressor impeller for the charging device of the internal combustion engine, wherein the impeller comprises:

a hub;

a number of full blades arranged on the hub and being spaced in a circumferential direction of the impeller; and one splitter blade comprising a leading edge and an outlet edge, said splitter blade arranged between a pressure side of a first full blade and a suction side of a second full blade of the number of full blades, wherein the leading edge of the splitter blade is arranged closer to the pressure side of the first full blade than the outlet edge of the splitter blade, and the outlet edge of the splitter blade is located closer to the suction side of the second full blade than the leading edge of the splitter blade, and wherein a tip angle of the leading edge of the splitter blade is larger than blade angles of the first and second full blades measured in reference to an axis perpendicular to meridional projections of the leading edge on the first and second full blades.

19. A centrifugal compressor impeller for the charging device of an internal combustion engine, wherein the impeller comprises:

a hub;

a number of full blades arranged on the hub and being spaced in a circumferential direction of the impeller; and one splitter blade arranged between a pressure side of a first full blade and a suction side of a second full blade of the number of full blades, wherein a leading edge of the splitter blade is arranged closer to the pressure side of the first full blade than the suction side of the second full blade, and wherein a radius of an outlet edge portion of the splitter blade is 0.5-10% greater than radii of outlet edge portions of the first and second full blades.

20. The centrifugal compressor impeller of claim 19, wherein a radius of an outlet edge portion of the splitter blade is 3-7% greater than radii of outlet edge portions of the first and second full blades.

21. A centrifugal compressor impeller for a charging device of an internal combustion engine, wherein the impeller comprises:

a hub;

a number of full blades arranged on the hub and being spaced in a circumferential direction of the impeller; and one splitter blade arranged between a pressure side of a first full blade and a suction side of a second full blade of the number of full blades, wherein a leading edge of the splitter blade is arranged closer to the pressure side of the first full blade than the suction side of the second full blade, wherein a tip angle of the leading edge of the splitter blade is larger than blade angles of the first and second full blades measured in reference to an axis perpendicular to meridional projections of the leading edge on the first and second full blades, wherein a shroud side of the splitter blade is clocked towards a shroud side of the first full blade in relation to a center line extending between shroud sides of the first and second full blades, and wherein a first distance between the center line and a shroud side of the leading edge of the splitter blade is greater than a second distance between the center line and a shroud side of a portion of the splitter blade located downstream of the leading edge at 30% of a length of the splitter blade measured from the leading edge in an intended flow direction along the splitter blade.

* * * * *